United States Patent [19]
Lodholz, Jr.

[11] Patent Number: 4,860,854
[45] Date of Patent: Aug. 29, 1989

[54] RETRACTABLE LADDER ASSEMBLY

[76] Inventor: Gus A. Lodholz, Jr., 1010 Flora La., Florissant, Mo. 63031

[21] Appl. No.: 240,531

[22] Filed: Sep. 6, 1988

[51] Int. Cl.⁴ ........................... B60R 3/02; E06C 5/04
[52] U.S. Cl. ........................................ 182/88; 182/92
[58] Field of Search ..................... 182/88, 93, 97, 195, 182/91, 92; 280/166

[56] References Cited

U.S. PATENT DOCUMENTS

| | | | |
|---|---|---|---|
| 2,544,799 | 3/1951 | McCann . | |
| 2,642,217 | 6/1953 | Jennings . | |
| 2,678,831 | 5/1954 | Fisher | 182/88 |
| 2,809,849 | 10/1957 | Benne | 182/88 |
| 3,008,533 | 11/1961 | Haberle | 182/88 |
| 3,406,984 | 10/1968 | Kilbey . | |
| 3,826,337 | 7/1974 | Liptak | 280/166 |
| 4,093,257 | 6/1978 | Tarvin . | |
| 4,139,078 | 2/1979 | Keller . | |
| 4,140,327 | 2/1979 | Hackney, III . | |

*Primary Examiner*—Reinaldo P. Machado
*Attorney, Agent, or Firm*—Rogers, Howell, Moore & Haferkamp

[57] ABSTRACT

A ladder assembly, primarily for use on vehicles having compartments inconveniently displaced from the ground, has a ladder slidably attached to a storage portion between a retracted storage position and a substantially vertical, operative position, wherein the ladder is reachably displaced above the ground in the operative position. The storage portion is designed to retractably and securely store the ladder when not in use and to prevent disengagement of the ladder from the storage portion when the ladder is in the operative position. The ladder assembly further includes a bracing portion which prevents swinging movement of the ladder, in the operative position, towards the storage portion.

12 Claims, 1 Drawing Sheet

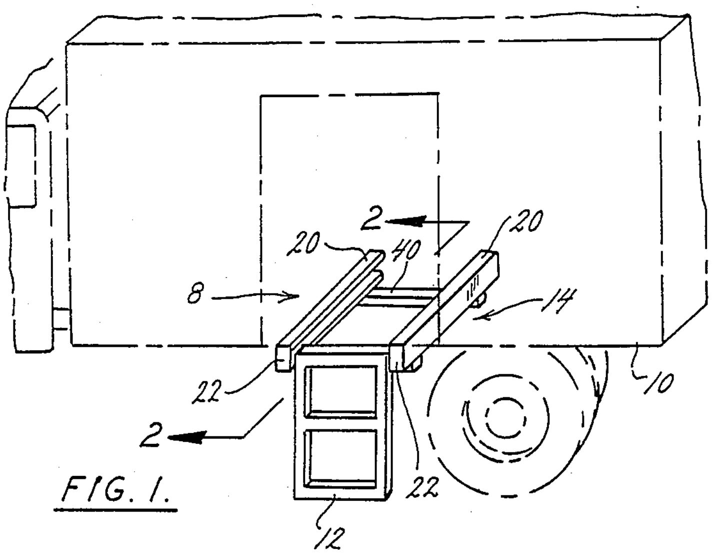
FIG. 1.
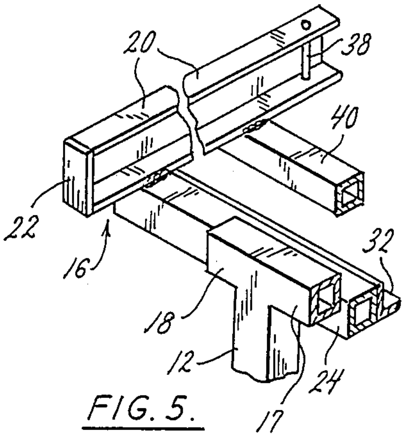
FIG. 5.
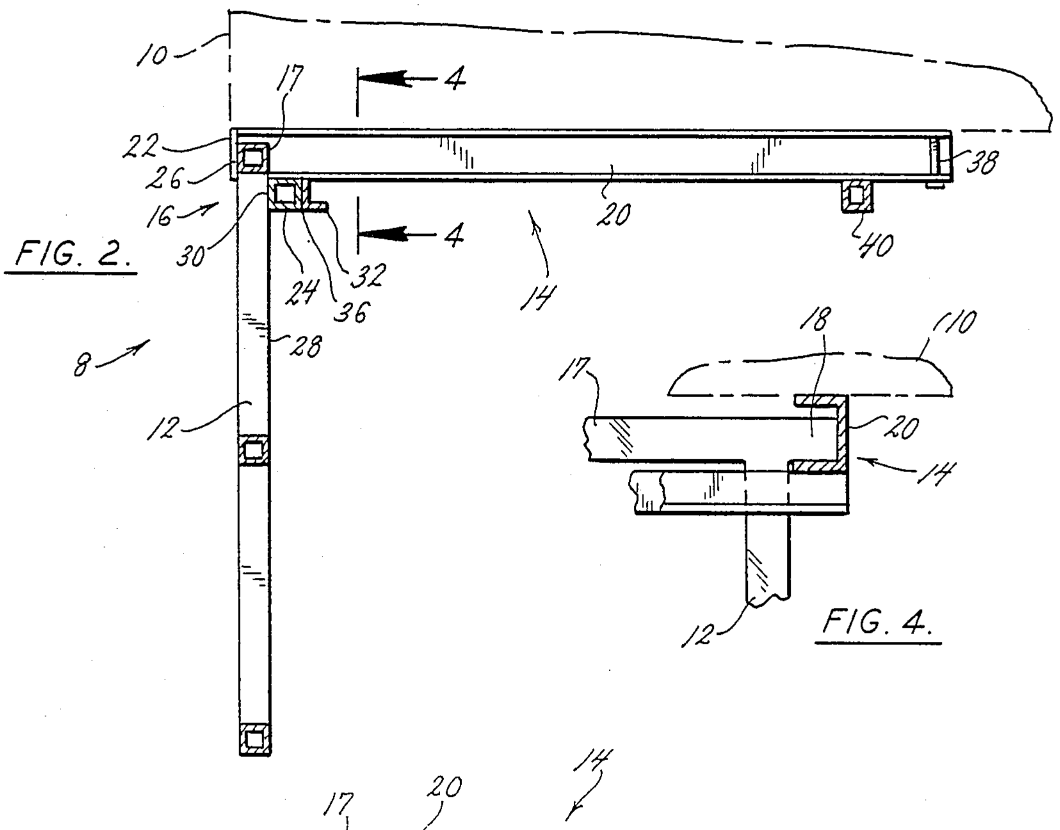
FIG. 2.
FIG. 4.
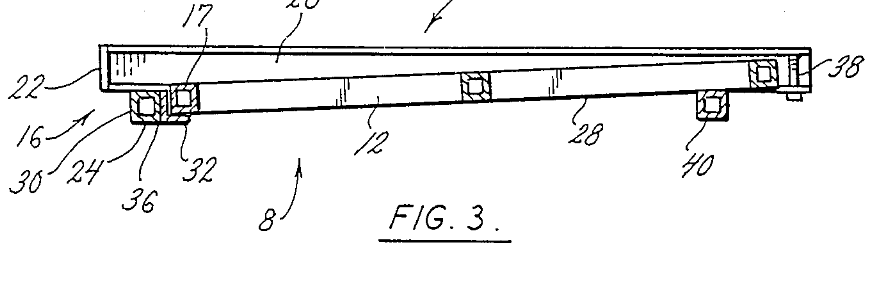
FIG. 3.

RETRACTABLE LADDER ASSEMBLY

BACKGROUND AND SUMMARY OF THE INVENTION

This invention relates generally to a retractable ladder assembly for facilitating access to vehicle compartments inconveniently displaced from the ground.

Ladder assemblies for vehicles are known in the art. Examples are shown in U.S. Pat. Nos. 4,139,078, 2,642,217, and 4,093,257. However, these prior art devices do not provide advantages and features offered by the present invention.

Large vehicles, such as trucks, trailers or the like, are being used for transportation of goods as well as for recreational purposes. Many of these vehicles have passenger and storage areas which are difficult to reach due to their displacement from the ground. Accordingly, drivers supplied their own ladder, which presented problems of ladder storage and ladder slippage, since the ladder was not attached to the vehicle. Alternatively, some drivers climbed on areas of the vehicle not designated for such use to gain access to the vehicle compartments, thus creating a risk of personal injury.

Prior art devices alleviated some of these problems by providing assemblies attached to the vehicle underside and having ladders slidable between operative and stored positions wherein the ladder, in the operative position, extends downwardly and has its bottom resting on and supported by the ground. However, ladder stability problems arose where the ground was uneven or loose gravel existed.

Other prior ladder assemblies had a ladder maintained in a substantially vertical, operative position at a reachable distance from the ground, and further included members to prevent movement of the ladder when in use, alleviating the stability problems associated with the assemblies requiring ground support for the ladder. However, numerous interacting, specially designed parts were required to prevent movement of the ladder when in use. This increased the cost of manufacture and the possibility of malfunction.

The present invention provides further advantages and overcomes additional problems noted above. The ladder assembly of the present invention includes a ladder portion, a storage portion, and a sturdy yet inexpensive bracing portion. The ladder is slidably attached to the storage portion for movement between a retracted storage position in the storage portion and a substantially vertical, operative position. The ladder is conveniently and reachably displaced above the ground in the operative position, allowing a passenger to easily gain access to vehicle compartments inconveniently displaced from the ground.

The storage portion has means for retractably and securely storing the ladder when not in use, and a barrier means for preventing disengagement of the ladder portion in the operative position from the storage portion.

The bracing portion is comprised of an elongated bar vertically offset from the barrier means such that swinging movement of the ladder in the operative position toward the storage portion is prevented. Thus a driver or passenger of a vehicle may easily and safely climb the ladder to the vehicle compartment. The elongated bar is made in one piece and can be inexpensively manufactured to safely meet load requirements.

Additional advantages and features of the present invention will become apparent from the following description of the preferred embodiment taken in conjunction with the accompanying drawings and the claims appended hereto.

BRIEF DESCRIPTION OF DRAWINGS

FIG. 1 is a perspective view of a ladder assembly of the invention, illustrating the assembly mounted to a truck underside.

FIG. 2 is a sectional view taken along the line 2—2 of FIG. 1.

FIG. 3 is a view similar to FIG. 2 but illustrating the ladder in its retracted position.

FIG. 4 is a sectional view taken along the line 4—4 of FIG. 2.

FIG. 5 is a fragmentary exploded perspective view of the ladder assembly and illustrating the storage portion's ends.

DETAILED DESCRIPTION OF THE DRAWINGS

Referring now to the drawings, there is illustrated a ladder assembly, generally designated as 8, and constructed in accordance with and embodying the features of the present invention. The ladder assembly 8 is adapted to be mounted on the underside of a vehicle 10, and comprises a ladder 12, a storage portion generally designated as 14 and a bracing portion generally designated 16. The ladder 12 is slidably attached to the storage portion 14 for movement between a retracted storage position in the storage portion as shown in FIG. 3 and a substantially vertical, operative position as shown in FIG. 1. The bottom of the ladder is conveniently and reachably displaced above the ground in the operative position, allowing easy access to vehicle compartments inconveniently displaced from the ground. The bracing portion 16 prevents swinging movement of the ladder 12 in the operative position towards the storage portion 14.

Each side of the ladder top 17 includes a projection 18, as shown in FIG. 4, for engaging the storage portion 14.

The storage portion 14 comprises a pair of parallel elongated side members 20, having substantially U-shaped cross-sections as shown in FIG. 4. The side members 20 are spaced apart to receive the projection 18 from each side of the ladder top 17, and act as guides for the sliding rearward and forward movement of the ladder 12 between the retracted and operative positions.

The bracing portion 16 comprises a pair of end plates 22 which are attached to the front ends of the side members 20 and cap off the open cross-section areas as shown in FIG. 5. The bracing portion 16 further comprises an elongated bar 24 attached to the lower side of the storage portion 14. The bar 24 is horizontally and vertically offset from the end plates so that the ladder 12, when in the operative position, has its projections 18 abutting the end plates 22 at surface 26 and part of its rear ladder side 28 abutting the bar 24 at surface 30 as illustrated in FIG. 2. Hence, the end plates and bar constitute vertically offset members at opposite sides of the ladder preventing swinging movement of the ladder in its operative position towards the storage portion.

The storage portion 14 further comprises a support means 32 in the form of an L-shaped bracket, which is attached to the elongated bar 24 at surface 36. When the bottom of the ladder 12 slides past the elongated bar 24 to its retracted position, the bottom of the ladder drops on the support means 32, as shown in FIG. 3, and is securely supported thereon.

The storage portion 14 further has a backstop means 38, comprised of a pair of pins detachably mounted at the near ends of the side members 20, for preventing rearward movement of the ladder 12 in the retracted position, as illustrated in FIG. 3. When the pins are detached, the ladder 12 may be removed from the storage portion 14.

The side members 20 of the storage portion 14 are securely attached to the underside of the vehicle 10 with the necessary spacing for receiving the ladder 12. A cross member 40 also may be used for additional support.

In constructing the ladder assembly 8 of the present invention, the ladder 12 may be any length necessary to facilitate access to an inconveniently displaced vehicle compartment and should be of such strength to meet the loading requirements of the vehicle. The storage portion 14 is of a length and width necessary to store the ladder 12.

It will also be understood that the ladder assembly 8 of the present invention may be used in any situation where access from a lower level to an inconveniently displaced higher level is desired, such as may be encountered in typical household settings. The ladder assembly in such situation may be attached to a downwardly-facing generally horizontal surface.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A ladder assembly for vehicles comprising:
- a ladder, a storage portion, and a bracing portion;
- said ladder being slidably attached to said storage portion for movement between a retracted storage position in said storage portion and a substantially vertical operative position, said ladder being conveniently and reachably displaced above the ground in the operative position allowing easy access to a vehicle compartment inconveniently displaced from the ground;
- said storage portion having means for retractably and securely storing said ladder when not in use; and
- said bracing portion comprising vertically offset members at opposite sides of said ladder preventing swinging movement of the ladder in its operative position towards said storage portion.

2. The ladder assembly of claim 1 wherein one of said offset members comprises a barrier means for preventing disengagement of said ladder in the operative position from said storage portion, and another of said offset members comprises stop means on the opposite side of the ladder from and lower than said barrier means.

3. The ladder assembly of claim 1 wherein said ladder includes opposed lateral projections and said storage portion comprises a pair of elongated side members spaced apart to receive the opposed lateral projections, said side members acting as guides for the sliding rearward and forward movement of said ladder between the retracted and operative positions.

4. The ladder assembly of claim 3 wherein said side members have substantially U-shaped cross-sections for receiving said projections through the open sides of said U-shaped cross-sections.

5. The ladder assembly of claim 3 wherein said storage portion further comprises a support means attached to the bracing portion such that when the bottom of said ladder is moved past the bracing portion to its retracted position, the bottom of said ladder drops on said support means and is securely supported thereon.

6. The ladder assembly of claim 5 wherein said support means is an L-shaped bracket.

7. The ladder assembly of claim 3 or claim 5 wherein said storage portion further includes a backstop means for preventing rearward movement of the ladder in the retracted position.

8. The ladder assembly of claim 7 wherein said backstop means comprises a pin detachably mounted to said storage portion allowing for ladder removal from said storage portion when said pin is detached.

9. The ladder assembly of claim 2 wherein said stop means is an elongated bar.

10. A ladder assembly for vehicles comprising:
- a ladder, a storage portion, and a bracing portion;
- said ladder being slidably attached to said storage portion for movement between a retracted storage position in said storage portion and a substantially vertical operative position, said ladder being conveniently and reachably displaced above the ground in the operative position allowing easy access to a vehicle compartment inconveniently displaced from the ground;
- said storage portion having means for retractably and securely storing said ladder when not in use and having a barrier means for preventing disengagement of said ladder in the operative position from said storage portion; and
- said stop means being vertically offset from said barrier means for preventing swinging movement of the ladder in the operative position towards said storage portion.

11. The ladder assembly of claim 10 wherein said stop means is an elongated bar.

12. A collapsible ladder assembly adapted for attachment to a downwardly-facing generally horizontal surface, comprising:
- a ladder, a storage portion adapted for attachment to a downwardly-facing generally horizontal surface, and a bracing portion;
- said ladder being slidably attached to said storage portion for movement between a retracted storage position in said storage portion and a substantially vertical operative position, said ladder being conveniently and reachably displaced above the ground in the operative position allowing easy access to an area inconveniently displaced from the ground;
- said storage portion having means for retractably and securely storing said ladder when not in use; and
- said bracing portion comprising vertically offset members at opposite sides of said ladder preventing swinging movement of the ladder in its operative position towards said storage portion.

* * * * *